United States Patent
Baldemair et al.

(10) Patent No.: US 10,499,324 B2
(45) Date of Patent: Dec. 3, 2019

(54) TRANSMITTER FOR TRANSMITTING DISCOVERY SIGNALS, A RECEIVER AND METHODS THEREIN

(71) Applicant: Telefonaktiebolaget LM Ericsson (publ), Stockholm (SE)

(72) Inventors: Robert Baldemair, Solna (SE); Kumar Balachandran, Pleasanton, CA (US); Dennis Hui, Sunnyvale, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/926,549

(22) Filed: Mar. 20, 2018

(65) Prior Publication Data

US 2018/0213471 A1 Jul. 26, 2018

Related U.S. Application Data

(63) Continuation of application No. 15/425,914, filed on Feb. 6, 2017, now Pat. No. 9,955,411, which is a continuation of application No. 14/408,321, filed as application No. PCT/SE2012/050984 on Sep. 18, 2012, now Pat. No. 9,584,204.

(60) Provisional application No. 61/668,465, filed on Jul. 6, 2012.

(51) Int. Cl.
| | |
|---|---|
| *H04J 1/00* | (2006.01) |
| *H04W 48/16* | (2009.01) |
| *H04W 8/00* | (2009.01) |
| *H04B 7/06* | (2006.01) |
| *H04W 56/00* | (2009.01) |
| *H04W 72/04* | (2009.01) |
| *H04J 1/06* | (2006.01) |

(52) U.S. Cl.
CPC ............. *H04W 48/16* (2013.01); *H04B 7/06* (2013.01); *H04W 8/005* (2013.01); *H04W 56/001* (2013.01); *H04W 72/0453* (2013.01); *H04J 1/06* (2013.01)

(58) Field of Classification Search
CPC .......... H04W 56/001; H04W 72/0453; H04W 48/16
See application file for complete search history.

(56) References Cited

U.S. PATENT DOCUMENTS

| | | | |
|---|---|---|---|
| 9,584,204 B2 | 2/2017 | Baldemair et al. | |
| 2006/0240780 A1 | 10/2006 | Zhu et al. | |
| 2009/0086619 A1* | 4/2009 | Santhoff | H04B 1/7163 370/208 |
| 2009/0232126 A1 | 9/2009 | Cordeiro et al. | |

(Continued)

FOREIGN PATENT DOCUMENTS

| | | |
|---|---|---|
| WO | 2008033985 A2 | 3/2008 |
| WO | 2008075264 A2 | 6/2008 |

(Continued)

*Primary Examiner* — Chi H Pham
*Assistant Examiner* — Fahmida S Chowdhury
(74) *Attorney, Agent, or Firm* — Coats & Bennett, PLLC

(57) ABSTRACT

A transmitter and a method therein for transmitting discovery signals to a receiver. The transmitter and the receiver are comprised in a radio communications system. The transmitter transmits two or more discovery signals over two or more directions. Each discovery signal is configured to span over a fraction of a carrier bandwidth.

32 Claims, 10 Drawing Sheets

(56) References Cited

U.S. PATENT DOCUMENTS

| | | | |
|---|---|---|---|
| 2010/0069066 A1* | 3/2010 | Shen | H04J 11/0093 |
| | | | 455/434 |
| 2011/0149798 A1* | 6/2011 | Cordeiro | H04W 8/005 |
| | | | 370/254 |
| 2011/0205969 A1 | 8/2011 | Ahmad et al. | |
| 2013/0122893 A1 | 5/2013 | Turtinen et al. | |
| 2013/0229928 A1 | 9/2013 | Lipman et al. | |

FOREIGN PATENT DOCUMENTS

| | | |
|---|---|---|
| WO | 2008087595 A2 | 7/2008 |
| WO | 2012007838 A1 | 1/2012 |

* cited by examiner

TRANSMITTER FOR TRANSMITTING DISCOVERY SIGNALS, A RECEIVER AND METHODS THEREIN

CROSS-REFERENCE TO RELATED APPLICATIONS

This application is a continuation of application Ser. No. 15/425,914, filed Feb. 6, 2017, which is a continuation of application Ser. No. 14/408,321, filed Dec. 16, 2014, which is the national stage filing under 35 USC 371 of Application No. PCT/SE2012/050984, filed Sep. 18, 2012, which claims the benefit of Application No. 61/668,465, filed Jul. 6, 2012, each of which applications is incorporated by reference herein in its entirety.

TECHNICAL FIELD

Embodiments herein relate to a transmitter, a receiver and methods therein. In particular, embodiments herein relate to the transmittal of discovery signals to the receiver.

BACKGROUND

Communication devices such as User Equipments (UE) are enabled to communicate wirelessly in a radio communications system, sometimes also referred to as a radio communications network, a mobile communication system, a wireless communications network, a wireless communication system, a cellular radio system or a cellular system. The communication may be performed e.g. between two user equipments, between a user equipment and a regular telephone and/or between a user equipment and a server via a Radio Access Network (RAN) and possibly one or more core networks, comprised within the wireless communications network.

User equipment are also known as e.g. mobile terminals, wireless terminals and/or mobile stations, mobile telephones, cellular telephones, or laptops with wireless capability, just to mention some examples. The user equipments in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: GroupeSpecial Mobile).

In the context of this disclosure, the expression Downlink (DL) is used for the transmission path from the base station to the user equipment. The expression Uplink (UL) is used for the transmission path in the opposite direction i.e. from the user equipment to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

The past 30 years have seen a tremendous improvement in the state of Information and Communication Technologies (ICT), formally led by the Computing and the Telecommunications industries. This improvement is most felt in the increase in global Internet traffic, which has been conservatively predicted to reach a ten-fold growth from 2010 levels by 2016. Other forecasts by Cisco predict an increase in traffic of as much as a 92% cumulative annual growth rate; this amounts to a 700-fold increase in traffic by 2020.

A majority of this traffic growth is expected to come from the increased consumption of video on mobile networks, as well as a net increase in subscribers transitioning to mobile broadband even as the fixed and mobile networks converge to provide end-user experience that is indistinguishable in many environments. Added to this, it has been predicted that the mobile broadband industry will get most of its growth in the number of connections from the widespread introduction of Machine Type Communication (MTC) devices that will drive the Machine-to-Machine (M2M) market for applications from diverse industries such as Utilities (e.g. Smart Grid), Automotive (e.g. Intelligent Transportation), Health care. Apart from these industries, the broad area of Industrial Automation is expected to create new business opportunities in a variety of industries such as Agriculture, Mining and Exploration, Oil and Natural Gas Distribution, Residential and Building Automation etc. Estimates of the number of devices vary widely from our own declamation of an increase from 5 billion subscriptions to 50 billion connected devices.

One key development that is inevitable is a merging of fixed and wireless networks in what has been termed as the Fixed Mobile Convergence (FMC).

There is still some scope for a part of the predicted traffic increase to happen due to network build out in areas of the world not covered by mobile broadband. However, it is also true that much of the increase in data traffic will happen based on the kind of activities people engage in over the Internet, such as the transition of video services from broadcast networks to online video sources. This leads to our conviction that the bulk of Internet traffic increase will happen in areas that are already served by cellular networks.

Table 1 below is a generational classification of broadband cellular technologies. The table uses an accepted and correct technical classification, while it is acknowledged that industry and media may often use a more sensational approach to distinguishing a generation. With the introduction of LTE and all indications of LTE being the sole surviving cellular standard, it is now possible to identify a true convergence of mobile radio technologies.

| International Telecommunication Union (ITU) Classification/ | | International Mobile Telecommunications 2000 (IMT-2000) | | IMT-Advanced |
|---|---|---|---|---|
| Generation | 1G | 2G | 3G | 4G |
| Technology Examples | AMPS/NMT | GSM/EDGE (as component of EIA/TIA-136) EIA/TIA-95 | WCDMA/HSPA CDMA2000/evDO WiMAX rel. 1.1 | 3GPP LTE IEEE 802.16-2009 |
| Type | Analog | Digital | Digital | Digital |
| Channelization | <100 KHz | <1 MHz | <10 MHz | <100 MHz |
| Frequency band | 400-1000 MHz | 400-2000 MHz | 400-3000 MHz | 200-5000 MHz |
| Data rates | <10 kb/s/user | <1 Mb/s/cell | <100 Mb/s/cell | <1 Gb/s/cell |
| Services | Voice telephony | Voice/data | Voice/Data | Data (voice included) |

Table 1 generational classification of broadband cellular technologies. The data rates are in orders of magnitude and the numbers are approximations.

The US National Broadband Plan aims to create new allocations for mobile, fixed and unlicensed broadband access of up to 500 MHz of spectrum below 5 GHz by 2020 (FCC, "Connecting America: The National Broadband Plan," at http://www.broadband.gov, March 2010.) Currently 547 MHz has been designated as flexible use spectrum for wireless broadband, of which roughly 170 MHz is available to cellular and Personal Communications Service (PCS) operators. With the existing allocations of 547 MHz of spectrum including the recent Advanced Wireless Services-1 (AWS-1) auctions, this should give the mobile industry over 800 MHz of spectrum to improve their ability to handle more users and newer services. Even with such largesse, it is inconceivable that system capacity for cellular networks will improve by an order of magnitude in the future without significant reengineering of the way networks are deployed.

It should be noted that the lack of spectrum has driven wireless network deployment in two directions.

Firstly, every system has improved throughputs as well as spectral efficiency over the previous generation using a variety of technological approaches such as
- a reduction in cell size through densification of the network, the development of Heterogeneous networks (hetnets) as a means of boosting capacity and bitrates,
- deployment of additional spectrum,
- packet data based on the Internet Protocol (IP),
- wider bandwidths,
- link adaptation using adaptive modulation and coding, and Hybrid-Automatic Repeat reQuest (HARQ),
- higher order modulation schemes,
- antenna techniques such as beamforming and Multi-Input Multi-Output (MIMO),
- advanced receiver architectures such as Successive Interference Cancellation (SIC), multi-stage SIC, joint demodulation,
- advanced network procedures such as interference coordination.

These techniques have provided the means to increase peak spectral efficiencies per link to as much as 15 b/s/Hz. Of course, the observed cell spectral efficiencies vary according to the radio environment and the interference level and typically are of the order of 1-3 b/s/Hz on average.

Secondly, systems such as LTE that may operate over channel bandwidths of up to 100 MHz do so with the aid of carrier aggregation. Aggregation of carriers cannot be done arbitrarily and radio requirements become very complicated when specifying the particular combinations of carrier bandwidths that may be used to populate a band or combined across bands.

Given the state of spectrum allocations for mobile systems, it is of interest to see if the evolution of modern mobile networks may proceed beyond 4G. The objective of such an evolution would be to improve data rates by yet another order of magnitude over the last generation, and to moreover do this under the assumption of a dense deployment of infrastructure nodes providing radio links to mobile users. Such a network would also need to do be deployed with much larger spectrum allocations, typically operating under conditions of low to moderate mobility. The reach of such a network would span indoor locations as well as densely populated urban centers.

Today's cellular communication occurs largely in frequency bands below 3 GHz in what we term as an interference-limited environment. While LTE may operate over bandwidths of as much as 100 MHz by design, the future radio access system we envisage would operate over bandwidths of the order of 1 GHz. Clearly, such a system could not operate in bands below 3 GHz. The lowest band where the mobile industry may home for spectrum parcels that exceed the 10-40 MHz of contiguous allocations typical for the industry is probably above 3 GHz. Of the regions of spectrum that are most promising for the mobile industry, the cm-Wave (CMW) region from 3-30 GHz and the mm-Wave (MMW) region from 30-300 GHz may be considered as being particularly interesting for the next generation mobile systems.

Table 2 is a link budget for a pair of radios that are configured to operate in two modes. By the term "radios" when used herein is meant devices comprising both transmission and reception functions. The first mode is a low data rate mode using low antenna gain and the second mode is a high data rate mode using high antenna gain. It is well known that such a variation in antenna gain may be obtained by using active antenna solutions composed of many antennas integrated with a set of radio chains that are at most equal in number to the number of antenna elements. The conducted power from the transmitters are transferred to the antenna elements through a transfer matrix that may adjust the phase and optionally the amplitude of the transmitter outputs so as to create a resultant directivity pattern for the antenna array that may either have a high gain or a low one. Typically, the tradeoff in such an arrangement is between the spatial region covered by the antenna, which is large for a low effective array gain, and is narrow when a high gain is chosen.

| Parameter | Case 1 link budget | Case 2 Link budget |
| --- | --- | --- |
| Tx Power: P_TX | 20 dBm | 20 dBm |
| Tx Antenna Gain: G_T | 2 dB | 14 dB |
| Equivalent Isotropically Radiated Power (EIRP) | 22 dBm | 34 dBm |
| Bandwidth | 1 GHz | 1 GHz |
| Noise power: kTB | −84 dBm | −84 dBm |
| Rx Antenna Gain: G_R | 0 dB | 14 dB |
| Receiver Noise Figure (NF) | 7 dB | 7 dB |
| Receiver Sensitivity Margin | 2 dB | 2 dB |
| Shadowing margin | 3 dB | 3 dB |
| Carrier-to-Noise Ratio (C/N) needed | −3 dB (0.1 b/s/Hz) | 14 dB (5 b/s/Hz) |
| Required received power | −72 dBm | −61 dBm |
| Path loss budget | 94 dBm | 95 dBm |
| Range (40 GHz) | 30 m | 30 m |

Table 2 Link budget at 40 GHz for a pair of radios that is able to trade off data rate for antenna gain. A free space propagation loss model has been used for illustrative purposes. Shadowing losses are meant to represent all possible additional propagation losses. Some common losses such as those at the transmit and receive switch may have been ignored.

In a system that transmitter wise relies on narrow beams to obtain the required link budget a problem is to enable a receiving device to find the transmitting system, i.e. to make the receiving device aware of the presence of the system.

In traditional cellular systems such a signal is typically transmitted with a very wide beam pattern thus enabling receiving devices in the coverage area of the wide beam to detect the system.

In a system that relies on high-gain transmitter beamforming to achieve the required link budget a wide beam may not convey sufficient energy into a given direction for a receiving device to detect the system. In IEEE 802.11ad standard this problem is solved by beamforming a wideband discovery signal into one particular direction and in a Time Division Multiplexing (TDM) fashion cycle through different transmit directions to cover the complete area of interest.

A problem is that this solution cannot be applied to an envisioned Super-Densed Network (SDN) wherein also narrowband devices should be capable of accessing the system since they cannot receive a wideband discovery signal.

SUMMARY

An object of embodiments herein is to provide a way of improving the performance in a communications network.

According to a first aspect of embodiments herein, the object is achieved by a method in a transmitter for transmitting discovery signals to a receiver. The transmitter and the receiver are comprised in a radio communications system. The transmitter transmits two or more discovery signals over two or more directions, wherein the each discovery signal is configured to span over a fraction of a carrier bandwidth.

According to a second aspect of embodiments herein, the object is achieved by a transmitter for transmitting discovery signals to a receiver. The transmitter and the receiver are comprised in a radio communications system. The transmitter is configured to transmit two or more discovery signals over two or more directions, wherein each discovery signal is configured to span over a fraction of a carrier bandwidth.

According to a third aspect of embodiments herein, the object is achieved by a method in a receiver for receiving discovery signals from a transmitter. The transmitter and the receiver are comprised in a radio communications system. The receiver receives from the transmitter at least one of two or more discovery signals that have been transmitted into two or more directions wherein each discovery signal is configured to span over a fraction of a carrier bandwidth.

According to a fourth aspect of embodiments herein, the object is achieved by a receiver for receiving discovery signals from a transmitter. The transmitter and the receiver are comprised in a radio communications system. The receiver is configured to receive from the transmitter at least one of two or more discovery signals that have been transmitted into two or more directions, wherein each discovery signal is configured to span over a fraction of a carrier bandwidth.

Since two or more discovery signals are transmitted over two or more directions and since each discovery signal spans over only a fraction of the carrier bandwidth, the receiver is enabled to detect a wideband carrier even if the receiver is a narrowband receiver, i.e. a receiver supporting only a fraction of the total carrier bandwidth. This results in an improved performance in the communications network.

An advantage of embodiments herein is that a narrowband receiver is enabled to camp on a sub-band without first camping in the center of a wideband carrier, which center may be unknown to the narrowband receiver on beforehand.

A further advantage of embodiments herein is that a wideband receiver is enabled to scan multiple directions at once thus speeding up the discovery process.

BRIEF DESCRIPTION OF THE DRAWINGS

Examples of embodiments herein are described in more detail with reference to attached drawings in which:

In FIG. 10a, the discovery signals are repeated twice immediately after each other, and in FIG. 10b, the discovery signals are rotated and transmitted periodically;

DETAILED DESCRIPTION

Embodiments herein will be exemplified in the following non-limiting description.

As part of developing embodiments herein, a problem will first be identified and discussed.

It is proposed to create the next standard to operate over bandwidths that range from 100 MHz to 2.5 GHz in dense deployment and over frequency bands that allow the use of beamforming to establish near Line-of-Sight (LoS) links between communicating radios.

The resulting system may be used in a variety of scenarios, e.g. Point-to-point communications for short range radio systems such as Access to Network links for a Future Radio Access (FRA) system that provides very high speed wide area connectivity, and backhaul links between densely deployed infrastructure nodes that provide a high throughput pipeline to a network operator's core network, which core network may connect to the Internet and provide access to data and multimedia services.

Competing standards for Millimeter Wave (MMW) communications, e.g. the IEEE 802.11ad standard, operate over the whole channel bandwidth. In the example of the IEEE 802.11ad standard, the whole channel bandwidth is 2 GHz. A design for a Super-Dense Network (SDN) operating in the Millimeter Wave bands should however enable devices supporting less than the full channel bandwidth to find and operate on a wider carrier, e.g. a device supporting 200 MHz should be able to operate on a 2 GHz wide carrier. The IEEE 802.11ad standard and other MMW standards did not have this design guideline and therefore the developed discovery signals are not applicable for the SDN system.

Figure 1:
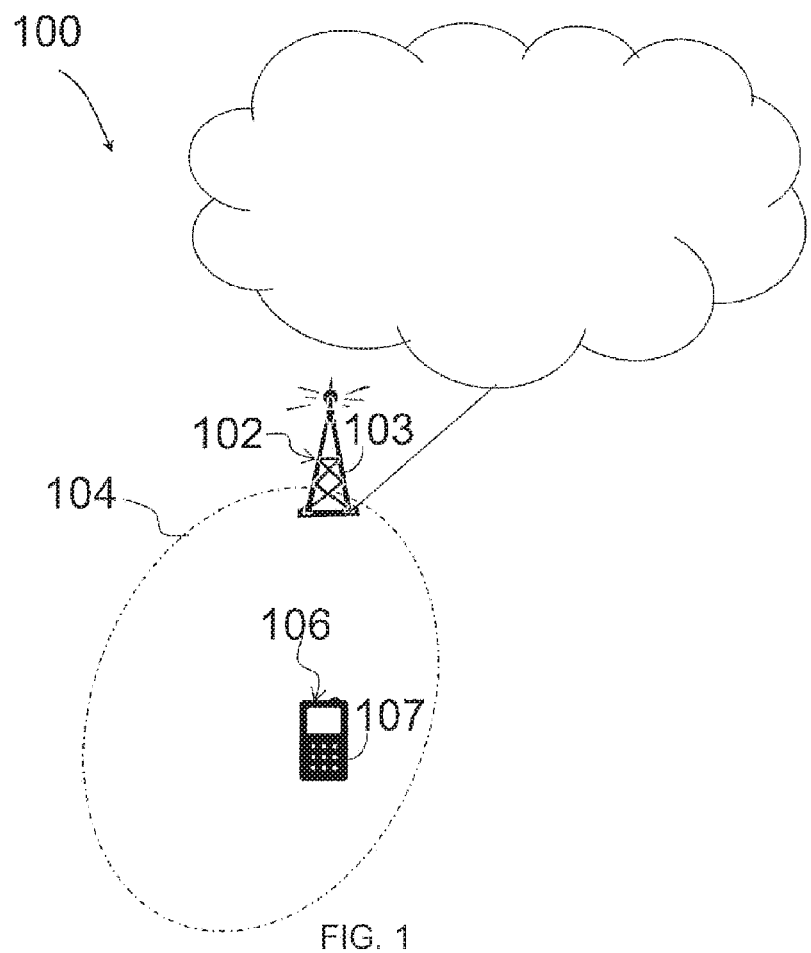
FIG. 1 is a schematic block diagram illustrating embodiments of a communications system.

FIG. 1 schematically illustrates embodiments of a radio communications system 100. The radio communication system 100 may be a 3GPP communications system or a non-3GPP communications system. The radio communications system 100 may comprises one or more of radio communications networks (not shown). Each radio communications network may be configured to support one or more Radio Access Technologies (RATs). Further, the one or more radio communications networks may be configured to support different RATs. Some examples of RATs are GSM, WCDMA, and LTE.

The radio communications system 100 comprises a radio network node 102. The radio network node 102 may be a base station such as an eNB, an eNodeB, Node B or a Home Node B, a Home eNode B, a radio network controller, a base station controller, an access point, a relay node which may be fixed or movable, a donor node serving a relay, a GSM/EDGE radio base station, a Multi-Standard Radio (MSR) base station or any other network unit capable to serve a user equipment or another radio network node comprised in the cellular communications system 100.

Further, it should be understood that the radio network node 102 is one example of an access node (not shown) comprised in the radio communication system 100. When used herein the term "access node" represents a transition between the access link (between the user equipment and a network owned resource) and the backhaul which is typically confined to operator or network owned and managed resources. Embodiments herein may be applied to sets of peer radio entities as well and is equally applicable to an ad hoc network composed of user entities alone, where a master radio may send a discovery signal and a slave device may try detecting the discovery signal, without specifying the role of a master or slave to any particular device type.

The radio communications system 100 comprises further a transmitter 103. The transmitter 103 may be comprised in the radio network node 102. However, it should be understood that the transmitter 103 may be comprised in any other access node.

Further, the radio network node 102 provides radio coverage over at least one geographical area 104, which herein sometime is referred to as a cell 104.

The radio communications system 100 comprises further a user equipment 106. The user equipment 106 is located within the cell 104 and is served by the radio network node 102. Further, the user equipment 106 transmits data over a radio interface to the radio network node 102 in an uplink (UL) transmission and the radio network node 102 transmits data to the user equipment 106 in a downlink (DL) transmission.

The first user equipment 106 may be e.g. a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. The first user equipment 106 may further be configured for use in both a 3GPP network and in a non-3GPP network.

The radio communications system 100 comprises further a receiver 107. The receiver 107 may be comprised in the user equipment 106 or in a node such as an access node.

Further, it should be understood that the access node, such as radio network node, and the user equipment may each comprise both a transmitter and a receiver. Thus, in some embodiments, the receiver 107 may be comprised in a second access node, such as a second radio network node (not shown).

Embodiments herein relates to different designs of a directional discovery signal.

A first design multiplexes in the frequency-domain discovery signals for multiple directions into the same symbol. Each discovery signal spans only a fraction of the total carrier bandwidth and thus enabling narrow bandwidth devices to detect the wideband carrier.

Figure 7:
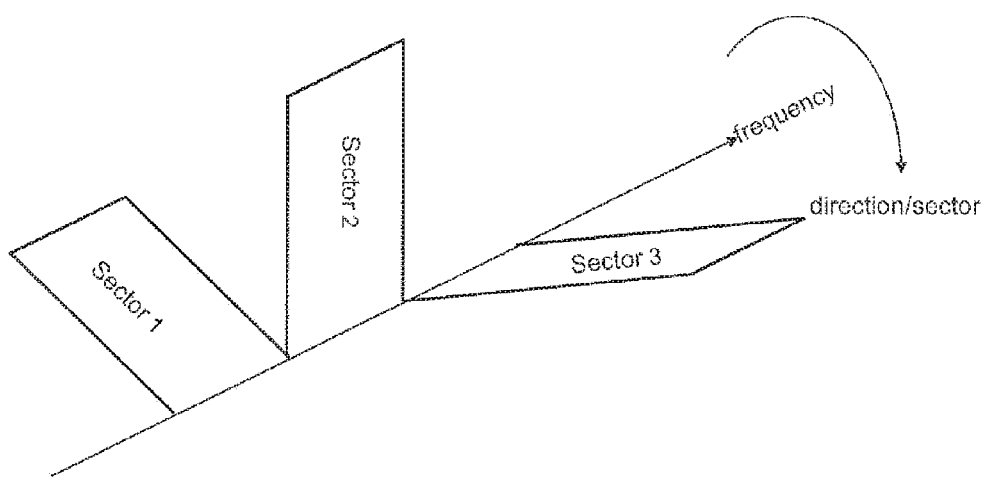
FIG. 7 schematically illustrates discovery signals for different directions (sectors) multiplexed in an FDM fashion.

FIG. 7 schematically illustrates how discovery signals for different directions, i.e. sectors, are multiplexed in a Frequency-Division Multiplexing (FDM) fashion. Each discovery signal spans over only a fraction of the total carrier bandwidth to enable narrowband devices comprising a receiver 107 to find the discovery signal. By means of the received discovery signal, the receiver 107 detects the transmitter 103. Further, by means of the received discovery signal, the receiver 107 may detect the radio communications system 100. A part of the total carrier bandwidth may be divided into a number of sub-bands. FIG. 7 will be further discussed below.

In a second design only one discovery signal is transmitted in a symbol. As in the first design this enables narrow bandwidth devices to detect the wideband carrier. Compared to the first design, the second design provides for an increase in the power radiated into a given direction and thereby increases the coverage area.

Figure 2A:
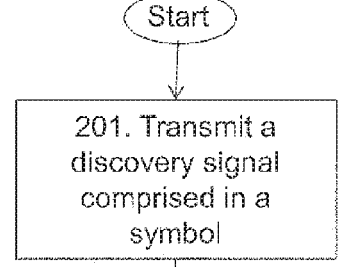
FIG. 2a is a flowchart depicting embodiments of a method in a transmitter.

A method in the transmitter 103 for transmitting discovery signals to a receiver 107 will now be described with reference to FIG. 2*a*.

As previously mentioned, the transmitter 103 and the receiver 107 are comprised in the radio communications system 100.

The method comprises the following actions, which do not have to be performed in the order stated below, but may be taken in any suitable order. Further, actions may be combined.

Action 201

In order for the receiver 107 to discover the transmitter 103, the transmitter 103 transmits at least one discovery signal, e.g. two or more discovery signals, over one or more directions, e.g. two or more directions. The one or more directions may be selected from a predetermined set of possible directions. The at least one discovery signal may be comprised in a symbol. In some embodiments, two or more discovery signals are transmitted in a single symbol. However, two or more discovery signals may be transmitted in two or more symbols. The symbol may be an OFDM symbol, but it may also be a symbol according to other OFDM-like schemes such as pulse-shaped OFDM, Isotropic Orthogonal Transform Algorithm OFDM (IOTA-OFDM), filter-bank OFDM, wavelet modulation, etc, or any system that separates its carrier bandwidth into multiple sub-bands. Further, the at least one discovery signal is configured to span over a fraction of a carrier bandwidth. Thereby, the receiver 107 may detect a wide bandwidth carrier even if the receiver 107 is a narrow bandwidth receiver.

The at least one discovery signal may be a synchronisation signal.

The carrier bandwidth may be separated into sub-bands. In some embodiments, a part of the carrier bandwidth is separated into sub-bands. Further, the carrier bandwidth may be in the range from 100 MHz to 2.5 GHz. Such a carrier bandwidth is herein sometimes referred to as a wide carrier bandwidth. Furthermore, the at least one discovery signal may be configured to span over one sub-band.

In some embodiments, the transmitter 103 multiplexes in the frequency-domain a plurality of discovery signals for a plurality of directions, and transmits the multiplexed plurality of discovery signals in the single symbol or in two or more symbols.

The transmitter 103 may transmit the at least one discovery signal together with information relating to at least one of: information indicating a beam direction, i.e. a signal direction, information indicating a frequency offset to the carrier centre and information indicating the transmitter 103.

Further, the transmitter 103 may transmit the at least one discovery signal into an independent direction. By the expression "independent direction" when used herein is meant a direction that is different from a direction of a second discovery signal. The second discovery signal may be the same discovery signal as a first discovery signal or it may be a discovery signal different from the first discovery signal.

The transmitter 103 may further, over time, cyclically transmit the at least one discovery signal into different directions.

In some embodiments, the location of the signaling sub-band may not be known to the narrowband devices, e.g. the receivers 107, beforehand, and the radio front-ends of some narrowband devices, e.g. receivers 107, may only be able to receive from a limited number of sub-bands. Therefore the transmitter 103 may periodically change the frequency location of the signaling sub-band, whereby each narrowband device may be allowed to detect the discovery signal by listening to a fixed sub-band all the time.

Figure 2B:
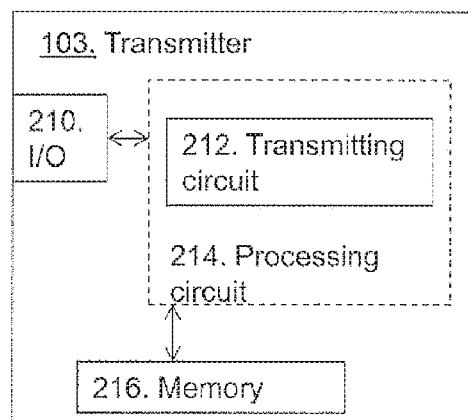
FIG. 2b is a schematic block diagram illustrating embodiments of a transmitter.

To perform the method action in the transmitter 103 described above in relation to FIG. 2*a*, the transmitter 103 may comprise the following arrangement depicted in FIG. 2*b*.

As previously mentioned, the transmitter 103 and the receiver 107 are comprised in a radio communications system 100.

The transmitter 103 comprises an input and output interface 210 configured to function as an interface for communication in the communication system 100. The communication may for example be communication with the receiver 107.

The transmitter 103 is configured to transmit at least one discovery signal, e.g. two or more discovery signals, over one or more directions, e.g. two or more directions. The one or more directions may be selected from a predetermined set of possible directions. The at least one discovery signal may be comprised in a symbol. In some embodiments, two or more discovery signals are transmitted in a single symbol. However, two or more discovery signals may be transmitted in two or more symbols. As previously mentioned, the symbol may be an OFDM symbol, but it may also be a symbol according to other OFDM-like schemes such as pulse-shaped OFDM, IOTA-OFDM, filter-bank OFDM, wavelet modulation, etc, or any system that separates its carrier bandwidth into multiple sub-bands. The transmitter 103 may comprise a transmitting circuit 212 configured to transmit the at least one discovery signal. Further, the at least one discovery signal is configured to span over a fraction of a carrier bandwidth. Thereby, the receiver 107 may detect a wide bandwidth carrier even if the receiver 107 is a narrow bandwidth receiver.

The at least one discovery signal may be a synchronisation signal.

The carrier bandwidth may be separated into sub-bands. In some embodiments, a part of the carrier bandwidth is separated into sub-bands. Further, the carrier bandwidth may be in the range from 100 MHz to 2.5 GHz. Furthermore, the at least one discovery signal may be configured to span over one sub-band.

In some embodiments, the transmitter 103 is further configured to multiplex in the frequency-domain a plurality of discovery signals for a plurality of directions, and to transmit the multiplexed plurality of discovery signals in the single symbol or in two or more symbols. The transmitter 103 may comprise a multiplexing circuit (not shown) configured to perform the multiplexing.

The transmitter 103 may further be configured to transmit the at least one discovery signal together with information relating to at least one of: information indicating a beam direction, information indicating a frequency offset to the carrier centre and information indicating the transmitter 103. In some embodiments, the transmitting circuit 212 is configured to transmit the at least one discovery signal together with information relating to at least one of: information indicating a beam direction, information indicating a frequency offset to the carrier centre and information indicating the transmitter 103.

Further, the transmitter 103 may be configured to transmit the at least one discovery signal into an independent direction. As previously mentioned, by the expression "independent direction" when used herein is meant a direction that is different from a direction of a second discovery signal. The second discovery signal may be the same discovery signal as a first discovery signal or it may be a discovery signal different from the first discovery signal.

In some embodiments, the transmitter 103 is configured to, over time, cyclically transmit the at least one discovery signal into different directions.

Embodiments herein for transmitting discovery signals to a receiver 107 may be implemented through one or more processors, such as a processing circuit 214 in the transmitter 103 depicted in FIG. 2b, together with computer program code for performing the functions and/or method actions of embodiments herein.

It should be understood that one or more of the circuits comprised in the transmitter 103 described above may be integrated with each other to form an integrated circuit.

The transmitter 103 may further comprise a memory 216. The memory may comprise one or more memory units and may be used to store for example data such as thresholds, predefined or pre-set information, etc.

Figure 3A:
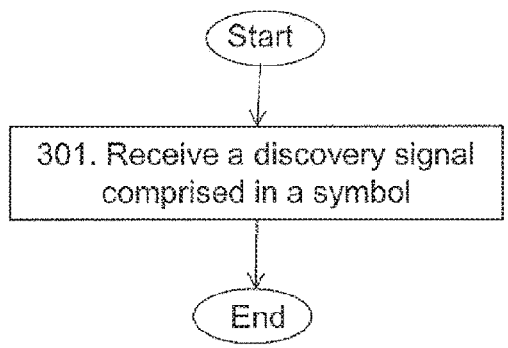
FIG. 3a is a flowchart depicting embodiments of a method in a receiver.

A method in a receiver 107 for receiving discovery signals from a transmitter 103 will now be described with reference to FIG. 3a.

As previously mentioned, the transmitter 103 and the receiver 107 are comprised in the radio communications system 100.

The method comprises the following actions, which do not have to be performed in the order stated below, but may be taken in any suitable order. Further, actions may be combined.

Action 301

The receiver 107 receives, from the transmitter 103, at least one discovery signal, e.g. two or more discovery signals, from one or more directions, e.g. two or more directions. The at least one discovery signal received by the receiver 107 may be at least one of two or more discovery signals transmitted from the transmitter 103. The at least one discovery signal may be comprised in a symbol. In some embodiments, two or more discovery signals are received in a single symbol. However, two or more discovery signals may be received in two or more symbols. As previously mentioned, the symbol may be an OFDM symbol, but it may also be a symbol according to other OFDM-like schemes such as pulse-shaped OFDM, IOTA-OFDM, filter-bank OFDM, wavelet modulation, etc, or any system that separates its carrier bandwidth into multiple sub-bands. Further, the at least one discovery signal is configured to span over a fraction of a carrier bandwidth. Thereby, the receiver 107 may detect a wide bandwidth carrier even if the receiver 107 is a narrow bandwidth receiver.

The at least one discovery signal may be a synchronisation signal.

The carrier bandwidth may be separated into sub-bands. In some embodiments, a part of the carrier bandwidth is separated into sub-bands. Further, the carrier bandwidth may be in the range from 100 MHz to 2.5 GHz. Furthermore, the at least one discovery signal may be configured to span over one sub-band.

In some embodiments, the receiver 107 receives the at least one discovery signal together with information relating to at least one of: information indicating a beam direction, information indicating a frequency offset to the carrier centre and information indicating the transmitter 103.

The receiver 107 may further receive the at least one discovery signal from an independent direction.

In some embodiments, the receiver 107 cyclically, over time, receives the at least one discovery signal that has been transmitted into different directions.

In some embodiments, the location of the signaling sub-band may not be known to the narrowband device, e.g. the receiver 107, beforehand, and the radio front-ends of some narrowband devices, e.g. receivers 107, may only be able to receive from a limited number of sub-bands. Therefore the transmitter 103 may periodically change the frequency location of the signaling sub-band, whereby the receiver 107 may be allowed to detect the discovery signal by listening to a fixed sub-band all the time.

Figure 3B:
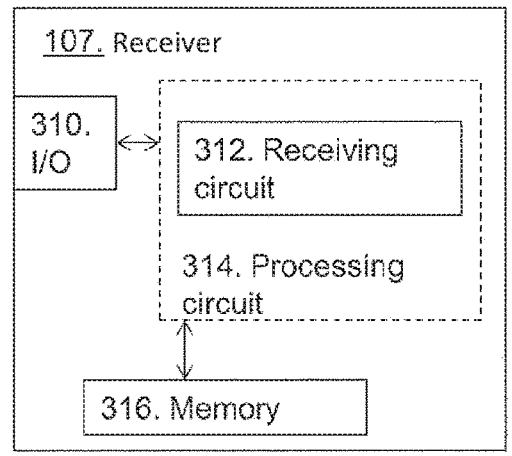
FIG. 3b is a schematic block diagram illustrating embodiments of a receiver.

To perform the method action in the receiver 107 described above in relation to FIG. 3a, the receiver 107 comprises the following arrangement depicted in FIG. 3b.

As previously mentioned, the transmitter 103 and the receiver 107 are comprised in the radio communications system 100.

The receiver 107 comprises an input and output interface 310 configured to function as an interface for communication in the communication system 100. The communication may for example be communication with the transmitter 103.

The receiver 107 is configured to receive, from the transmitter 103, at least one discovery signal that has been transmitted into one or more directions. Further, the receiver 107 may be configured to receive, from the transmitter 103, at least one of two or more discovery signals that have been transmitted into two or more directions. The at least one discovery signal may be comprised in a symbol. In some embodiments, two or more discovery signals are received in a single symbol. However, two or more discovery signals may be received in two or more symbols. As previously mentioned, the symbol may be an OFDM symbol, but it may also be a symbol according to other OFDM-like schemes such as pulse-shaped OFDM, IOTA-OFDM, filter-bank OFDM, wavelet modulation, etc, or any system that separates its carrier bandwidth into multiple sub-bands. The receiver 107 may comprise a receiving circuit 312 configured to receive the at least one discovery signal. Further, the at least one discovery signal is configured to span over a fraction of a carrier bandwidth.

The at least one discovery signal may be a synchronisation signal.

The carrier bandwidth may be separated into sub-bands. In some embodiments, a part of the carrier bandwidth is separated into sub-bands. Further, the carrier bandwidth may be in the range from 100 MHz to 2.5 GHz. Furthermore, the at least one discovery signal may be configured to span over one sub-band.

In some embodiments, the receiver 107 is further configured to receive the at least one discovery signal together with information relating to at least one of: information indicating a beam direction, information indicating a frequency offset to the carrier centre and information indicating the transmitter 103. The receiving circuit 312 may be configured to receive the at least one discovery signal together with information relating to at least one of: information indicating a beam direction, information indicating a frequency offset to the carrier centre and information indicating the transmitter 103.

The receiver 107 may be configured to receive the at least one discovery signal from an independent direction.

Further, the receiver 107 may be configured to, over time, cyclically receive the at least one discovery signal that has been transmitted into different directions. Embodiments herein for receiving a discovery signal from a transmitter 103 may be implemented through one or more processors, such as a processing circuit 314 in the receiver 107 depicted in FIG. 3b, together with computer program code for performing the functions and/or method actions of embodiments herein.

It should be understood that one or more of the circuits comprised in the receiver 107 described above may be integrated with each other to form an integrated circuit.

The receiver 107 may further comprise a memory 316. The memory may comprise one or more memory units and may be used to store for example data such as thresholds, predefined or pre-set information, etc.

Figure 4A:
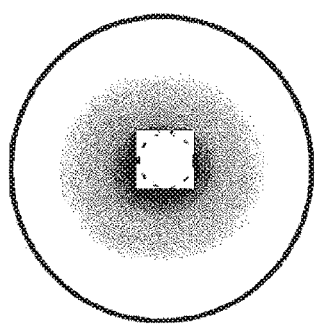
FIGS. 4a and 4b schematically illustrate active antenna arrays that are beamformed into low gain and large coverage, and high gain and narrow coverage, respectively.
Figure 4B:
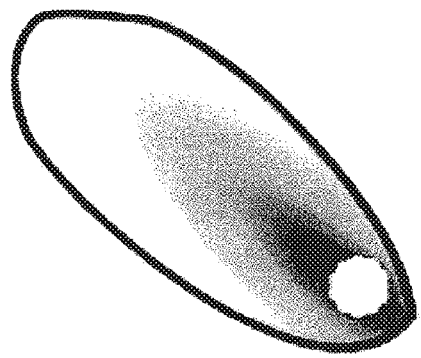

FIGS. 4a and 4b schematically illustrate active antenna arrays that are beamformed into low gain and large coverage, and high gain and narrow coverage, respectively. The active antenna arrays may be comprised in embodiments described herein.

Figure 5A:
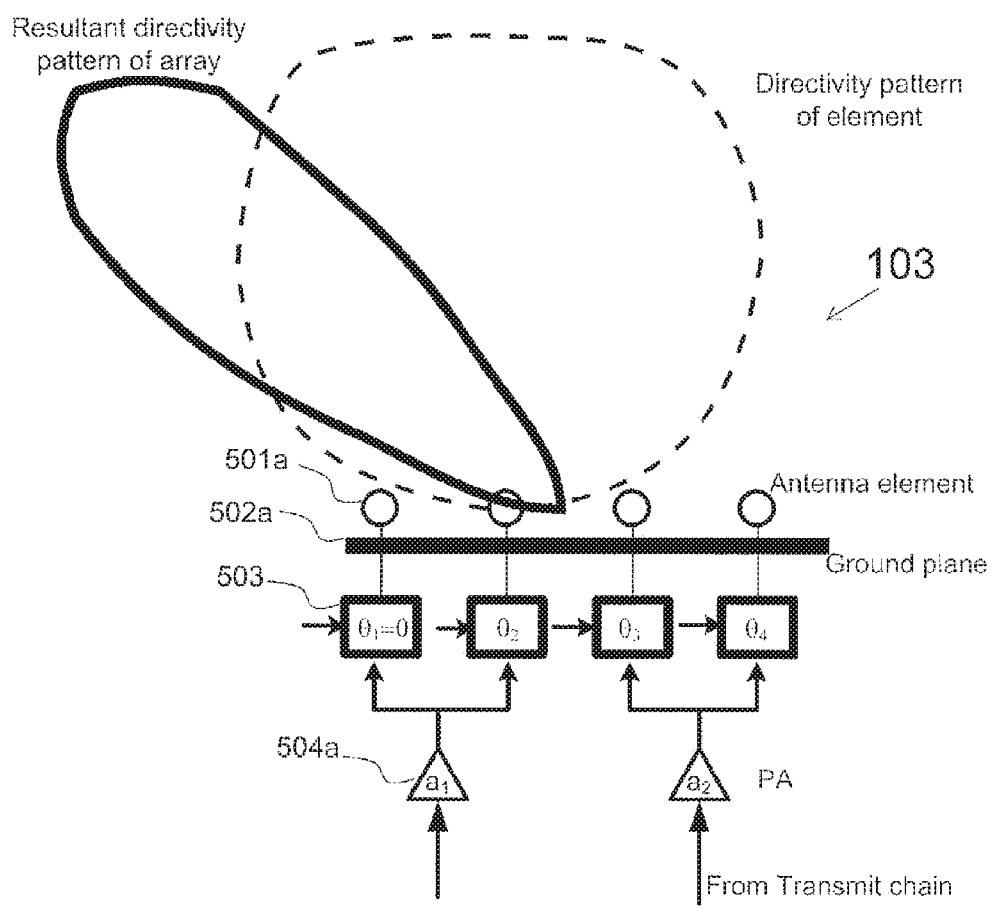
FIGS. 5a, 5b, and 5c schematically illustrate embodiments of transmitter (FIGS. 5a,5b) and receiver (FIG. 5c) representations for a four antenna element linear array with two antenna ports.
Figure 5B:
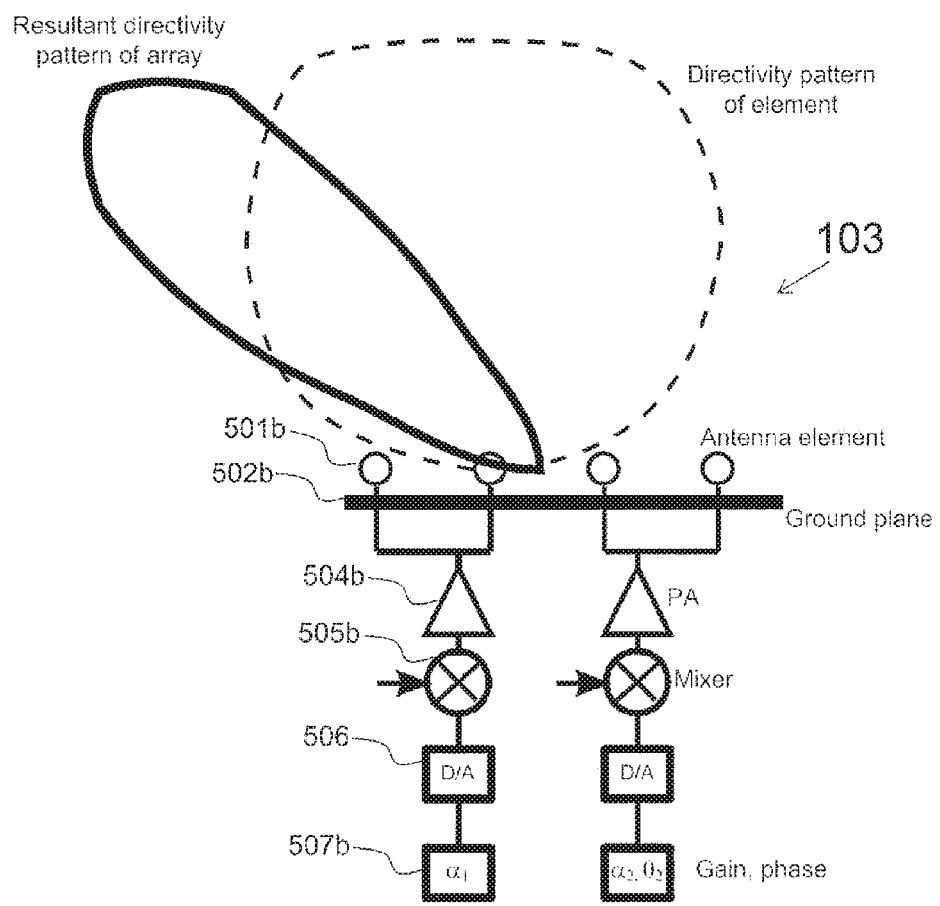
Figure 5C:
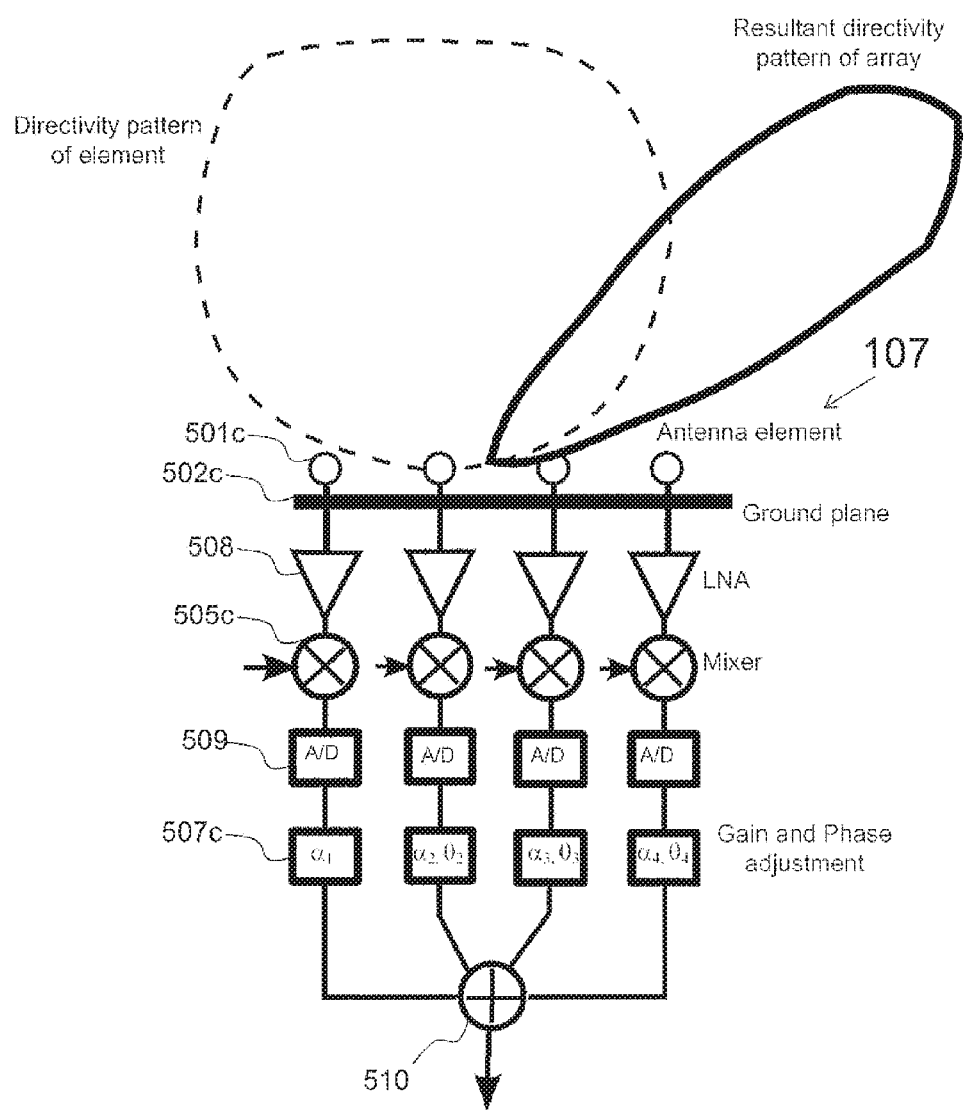

FIGS. 5a, 5b, and 5c schematically illustrate embodiments of the transmitter 103 (FIGS. 5a,5b) and the receiver 107 (FIG. 5c) comprising a four antenna element linear array with two antenna ports. Adjusting the phase and gain of the antenna elements may shape and steer the resulting antenna pattern. The antenna elements are spaced a fraction of a wavelength apart. In FIGS. 5a-5c, some components such as filters have been omitted.

FIG. 5a schematically illustrates embodiments of the transmitter 103 when having an analog gain and phase adjustment. The transmitter 103 comprises four antenna elements 501a. Further, the transmitter 103 comprises four phase adjustment circuits 503 to which the antenna elements 501a are connected. In FIG. 5a, a ground plane 502a is illustrated, which ground plane 502a is configured to function as a mirror to avoid beams back to the transmitter 103. The transmitter 103 comprises also two Power Amplifiers (PA) 504a to each of which a pair of phase adjustment circuits 503 is connected. A signal from the transmit chain will be power amplified at the PA 504a and then separated into two signals and fed to respective phase adjustment circuit 503. The respective phase adjustment circuit 503 will adjust the phase of the respective signals. Thereafter the two signals will be transmitted from the respective antenna elements 501a.

FIG. 5b schematically illustrates embodiments of the transmitter 103 having digital gain and phase adjustment. The transmitter 103 comprises four antenna elements 501b. Further, the transmitter 103 comprises two Power Amplifiers (PA) 504b to each of which a pair of antenna elements 501b is connected. In FIG. 5b, a ground plane 502b is illustrated, which ground plane 502b is configured to function as a mirror to avoid beams back to the transmitter 103. The ground plane 502b is comprised in the transmitter 103. Each PA 504b is connected to a mixer 505b comprised in the transmitter 103. Further, the transmitter 103 comprises two Digital-to-Analog converters (D/A) 506 and two gain and phase adjustment circuits 507b. Each gain and phase adjustment circuit 507b is connected to a respective mixer 505b via a respective D/A 506.

FIG. 5c schematically illustrates embodiments of the receiver 107 with receive beamforming. It should be understood that when the gain and phase of signals collected by a set of antennas are adjusted and then combined after the gain and phase adjustment, the resultant combined signal may appear as if from a particular set of spatial directions. If the gain and phase adjustment was made in a way where the receiver assumption of direction matches with the actual received signal, receive beamforming is obtained.

As illustrated in FIG. 5c, the receiver 107 comprises four antenna elements 501c, a ground plane 502c and four Low Noise Amplifiers (LNA) 508. Each antenna element 501c is connected to a respective LNA 508. The ground plane 502c is configured to function as a mirror to avoid beams back to the receiver 107. The receiver 107 comprises further four mixers 505c, four Analog-to-Digital converters (A/D) 509 and four gain and phase adjustment circuits 507c. Each gain and phase adjustment circuit 507c is connected to a respective mixer 505c via a respective A/D 509. Further, the transmitter comprises a combiner 510 to which each of the gain and phase adjustment circuits 507c is connected. The signals received from the antenna elements 501c are first amplified by LNA 508, downconverted into baseband signals by the mixer 505c, digitized by A/D 509, and then scaled accordingly by gain and phase adjustment circuits 507c before being (coherently) combined into a single baseband signal.

Figure 6:
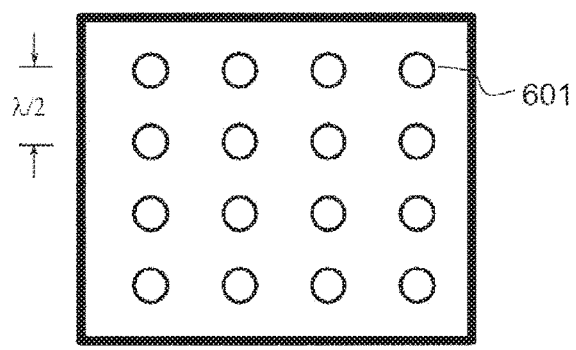
FIG. 6 is a schematic representation of a 16 element planar antenna array.

Further, FIG. 6 is a schematic representation of a 16 element planar antenna array that may be comprised in embodiments described herein, such as the receiver and the transmitter. As mentioned above, the antenna elements 601 are spaced a fraction of a wavelength apart. In FIG. 6, the antenna elements 601 are spaced half a wavelength a part, i.e. lambda($\square$)/2. However, it should be understood that they don't have to be spaced half a wavelength a part, i.e. lambda($\square$)/2.

Some embodiments will now be described in more detail.

Discovery Signals for Different Directions FDM/TDM Multiplexed

As previously mentioned, FIG. 7 shows an example of discovery signals for different directions, e.g. sectors, multiplexed in a FDM fashion according to embodiments herein. The carrier bandwidth is separated into sub-bands and in each sub-band a discovery signal is transmitted beamformed into an independent direction or into a number of directions. The number of directions is sometimes few, i.e. less than the total number of beamforming patterns possible. Most of the sub-bands will contain discovery signals pointing into different directions, but a number of sub-bands may comprise discovery signals pointing into the same directions. This may be useful if there are directions that are more "important" than other directions. By the expression "important directions" when used herein is meant directions that are more likely to have receivers 107, e.g. user equipment 106, that may be connected to. The likelihood may be determined by prior knowledge gathered during previous connections. Note that not the complete carrier bandwidth needs to be devoted to discovery signals. A part of the carrier bandwidth may be used which part may be divided into sub-bands carrying discovery signals.

Figure 8:
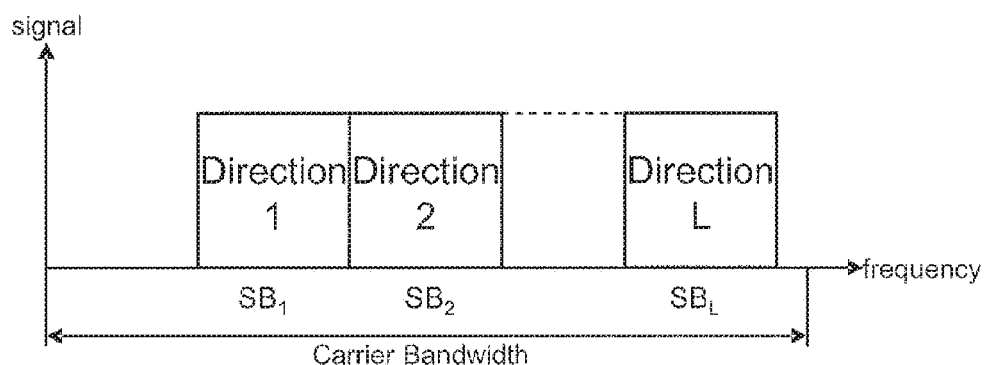
FIG. 8 schematically illustrates discovery signals for different directions multiplexed in frequency.

FIG. 8 schematically illustrates discovery signals for L different directions that are multiplexed in frequency according to embodiments herein. The directions are denoted Direction 1, Direction 2, . . . , and Direction L in FIG. 8. The sub-bands SB1, SB2, . . . , SBL carrying discovery signals may be consecutive, as in FIG. 8, but they don't have to be. The discovery signals may span over a fraction of the total carrier bandwidth, as shown in FIG. 8. However, it should be understood that the discovery signals may span over the complete carrier bandwidth.

In a simple case, the same discovery signal may be beamformed and transmitted in each sub-band, i.e. the same discovery signal may be transmitted into the different directions. In some embodiments, information is conveyed together with the discovery signal. The information may comprise e.g. information indicating the beam direction, information indicating the frequency offset to the carrier center, information indicating an access node comprising the transmitter 103. The access node may be a radio network node 102 such as a base station. Further, as previously mentioned, the access node may comprise a radio, i.e. both a transmitter and a receiver.

Transmission of multiple discovery signals, one for each direction, may be especially beneficial if the radiofrequency design does not permit to combine Power Amplifier (PA) power of many PAs into one direction. In other words, the transmission of multiple discovery signals may be beneficial when only one or few PAs may be combined to radiate into a direction. In one particular design of antenna arrays for a base station comprising a radio transmitter 103, multiple PAs are associated with particular pointing directions by integrating the PA and a one or more antenna elements into a single radio transmitter, cf. FIGS. 5a and 5b. In general, such an arrangement may impress signals of identical amplitude into the antenna elements associated with the radio transmitter, while the phase relationship between the signals being radiated out of those same elements would be determined by antenna spacing and optionally by phase shifters that precede each element. In a design with multiple PAs each PA is typically rated at a fraction of the output power of the transmitter and only the combined power achieves maximum output power. If only the power of a few PAs may be combined into a particular direction it makes sense to transmit discovery signals into other directions simultaneously since the power available for other directions may anyway not be reused in another direction.

Some implementations may prefer not to concentrate the full power on a fraction of the carrier bandwidth. This design also accommodates such limitations.

In embodiments wherein the receiver 107 is a narrowband device, which listens to one sub-band it may be located at any direction relative to the transmitter 103. The transmitter 103 may therefore cycle the transmitted discovery signals. That is, over time, discovery signals pointing into multiple directions may be transmitted in a sub-band, cf. FIG. 9 for a graphical illustration.

Figure 9:
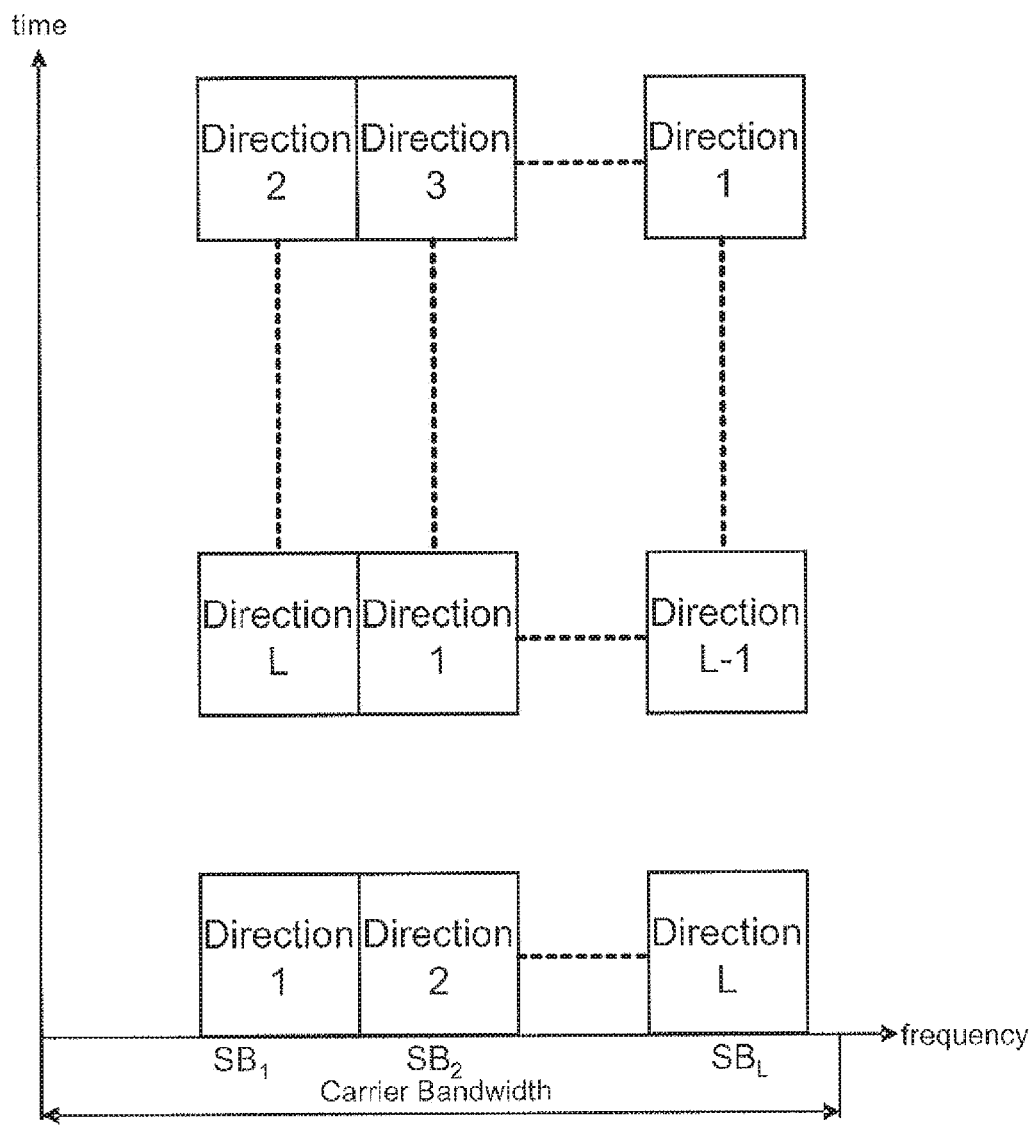
FIG. 9 schematically illustrates discovery signals for different directions multiplexed in frequency and repeated over time.

FIG. 9 schematically illustrates discovery signals for different directions multiplexed in frequency and repeated over time according to embodiments herein.

A device, such as receiver 107, capable of receiving multiple sub-bands may simultaneously listen to multiple sub-bands, i.e. directions, and thus speed up the discovery process. It is apparent that the same arguments regarding the association of PAs with antenna elements in the transmit direction described above hold for the receive direction in a reciprocal fashion, where the receiving aperture of multiple antenna elements may be increased by combining signals from a particular direction before or after low-noise amplification, cf. FIG. 5c. The outputs of each low noise amplifier would typically be downconverted into baseband or intermediate frequency signals and digitized individually for digital beamforming of multiple groups of associated antenna elements.

If the energy radiated into one direction is insufficient to enable reliable detection at the receiver 107 the received energy needs to be increased by accumulating across multiple discovery signals instances. The discovery signals for a particular direction may either be repeated several times in a row or periodically repeated. Both options are shown in FIGS. 10a and 10b, respectively.

Figure 10A:
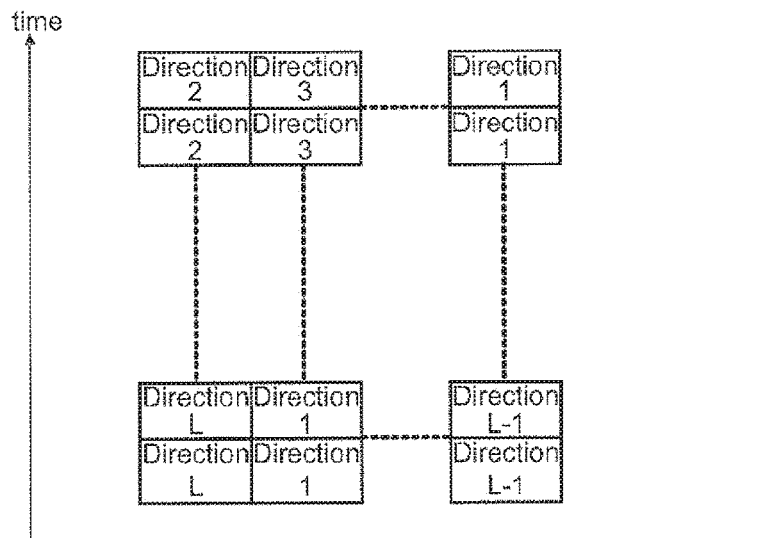
FIGS. 10a and 10b schematically illustrate discovery signals for different directions multiplexed in frequency and repeated over time.
Figure 10A:
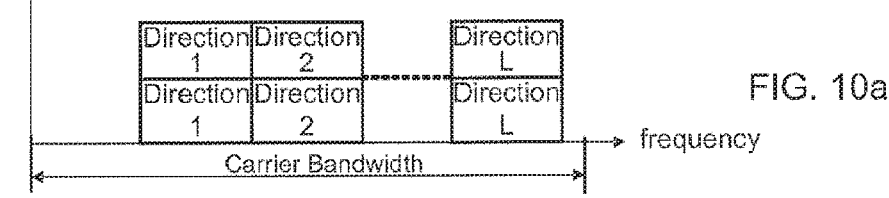
Figure 10B:
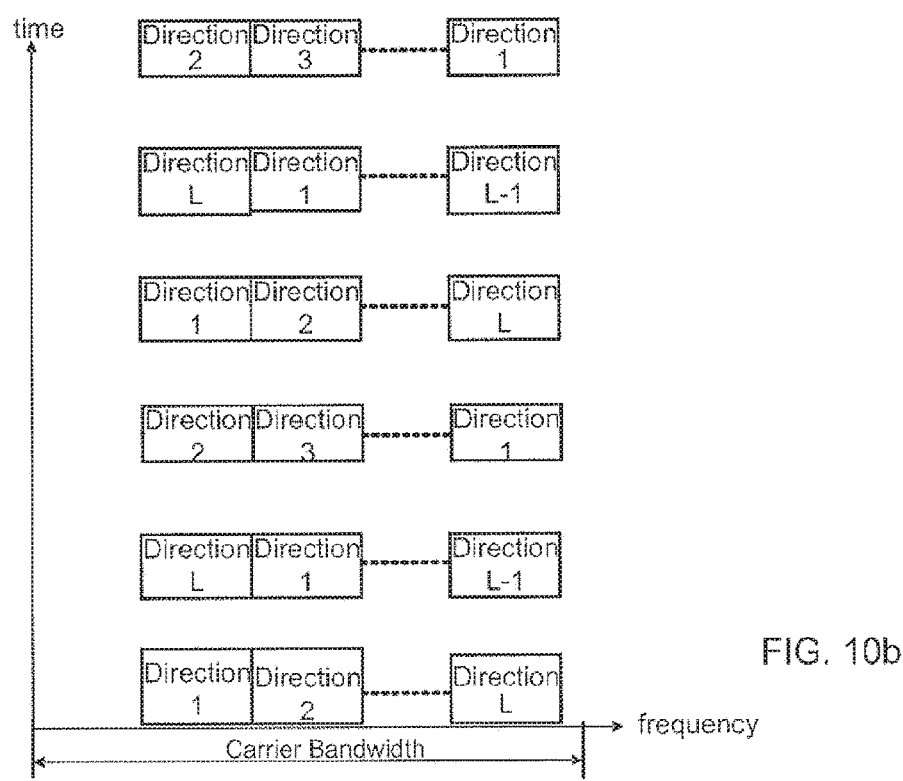

FIGS. 10a and 10b schematically illustrate that discovery signals for one particular direction may either be transmitted (twice in FIG. 10a) immediately after each other, and transmitted periodically, respectively, according to embodiments herein. A receiver 107 that may not detect a single-shot discovery signal may accumulate across multiple repetitions.

Although FIGS. 9, 10a, and 10b only show a natural ordering from 1 to L when cycling through different directions over different sub-bands, there is no limitation whatsoever in using any permutations of such ordering when cycling through different directions. Indeed, having some differentiation between the orders may help to create a color code for individual access nodes, each of which comprises a transmitter 103, so long as the choice of sequences may ensure low probability of collision between signals radiated from several access nodes.

Discovery Signals for Different Directions TDM Multiplexed

Figure 11:
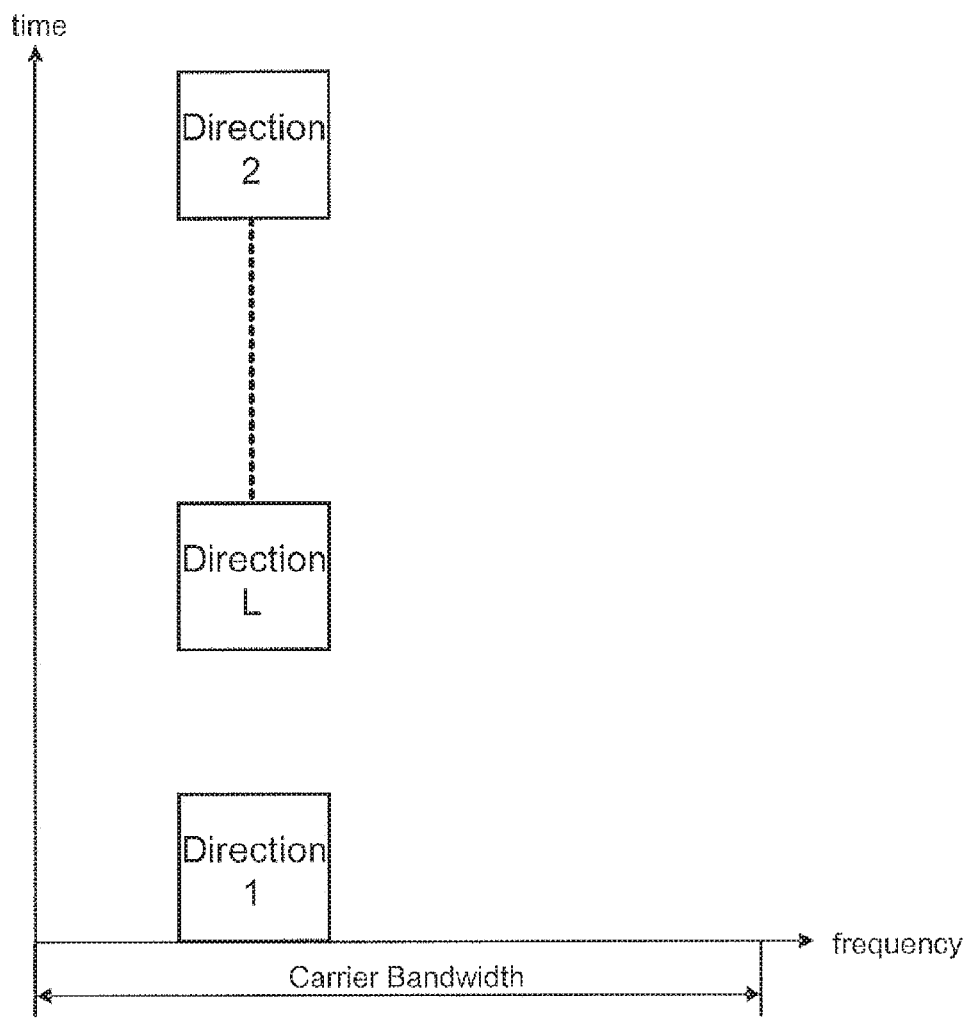
FIG. 11 schematically illustrates discovery signals for different directions multiplexed in TDM fashion and transmitted over the same sub-band.

According to some embodiments, an alternative design is to use a discovery signal, e.g. a narrowband discovery signal, which is always located at the same signaling sub-band, e.g. centered on the total carrier bandwidth. Cf. FIG. 11 that schematically illustrates discovery signals for different directions, e.g. sectors, multiplexed in TDM fashion and transmitted over the same sub-band. In such a design, each device, e.g. each receiver 107, may first find the central sub-band and may then later on be moved to other sub-bands. However, as illustrated in FIG. 11, the discovery signal does not have to be located in a sub-band centered on the total carrier bandwidth.

The discovery signal points into one direction or into few directions. By few directions is herein meant fewer directions than the total number of beamforming patterns possible. The total number of beamforming patterns possible is the total number of directions in which the transmitter 103 may point. To cover all directions the transmitter 103 cycles through different directions and transmits discovery signals.

In one simple exemplary implementation, an access node comprising the transmitter 103, has 2 analog interfaces feeding to independent PAs that are connected to 2 of 8 possible sectors that are defined by the radiation pattern of 8 horn antennas. The two sectors are addressed using a switching matrix that couples the PA outputs to particular directions. This means that two sectors may be simultaneously radiated from at a particular transmission interval. The two sectors correspond to two addressable antenna ports that may be addressed in 4×7=28 different ways. Each sector may have a unique discovery signal so that sectors may be identified at the receiver 107 and so that interference from multiple directions is avoided.

If the output power of multiple PAs may be combined to radiate into the same direction this design is particularly attractive since it allows for such power combining. If implementation allows, the full power of a single PA may be focused into one sub-band, and thereby increasing the radiated power into the given direction further. However, it should be noted that implementation limitations may suggest not concentrating the full power of one PA into a single sub-band.

If the energy received with a single discovery signal is insufficient the receiver 107 may increase the received energy by accumulating across multiple signals. As described above under the section "Discovery Signals for different directions FDM/TDM multiplexed", the discovery signal covering the same direction may be repeated a few times in a row or periodically transmitted. Such repetition may allow coherent combining of discovery signals as well as it may aid in synchronization. Combining discovery signals across wide separation of time would proceed non-coherently and may have to assume that fine time synchronization has been achieved through other means.

The discovery signals transmitted into the different directions may either be identical or different. In the latter case some information may be conveyed with the discovery signal. Some non-limiting examples of such information are an indication of the direction the discovery signal is transmitted into, information indicating the transmitter 103 or indicating an access node comprising the transmitter 103 may be comprised, and information indicating the cycling sequence may also be comprised, which may indicate the next direction to be transmitted in or additionally defining the transmitter 103 or the access node comprising the transmitter 103 as well.

Discovery Signals for Different Directions TDM Multiplexed, Frequency Hopping

In some embodiments similar to some embodiments described above under the section "Discovery Signals for different directions TDM multiplexed", in each time instance one direction or only a few directions are illuminated by the discovery signal at a signaling sub-band. Further, TDM is used to multiplex the remaining directions. The only difference between embodiments described in this section and embodiments described above under the section "Discovery Signals for different directions TDM multiplexed", is that in the embodiments described in this section frequency hopping is employed for the signaling sub-band, cf. FIGS. 12a and 12b.

Figure 12A:
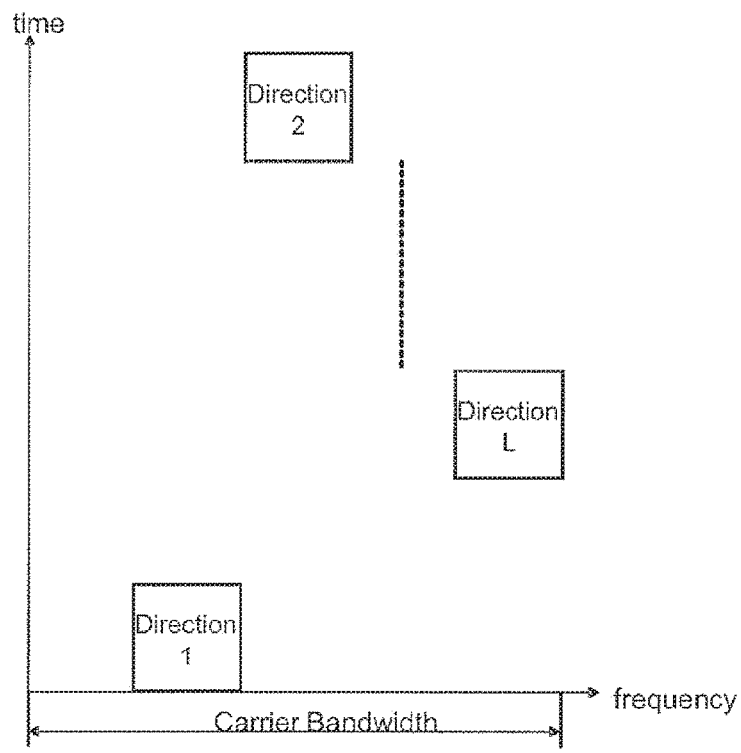
FIGS. 12a and 12b schematically illustrate discovery signals for different directions multiplexed in TDM fashion and transmitted over different sub-bands.
Figure 12B:
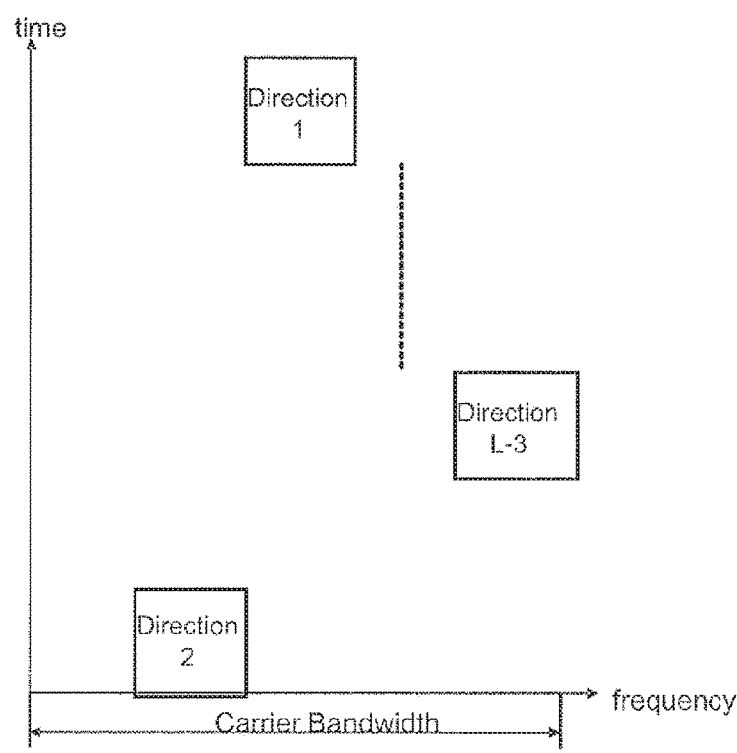

FIGS. 12a and 12b schematically illustrate discovery signals for different directions, i.e. sectors, multiplexed in TDM fashion and transmitted over different sub-bands. Further, frequency hopping is applied, i.e. the frequency sub-band used for the discovery signal changes over time. The mapping of directions to sub-band changes over time since some receivers 107 may not be able to receive the total carrier bandwidth. To make sure also those receivers 107 may receive the discovery signal all directions are transmitted from each sub-band over time. In FIGS. 12a and 12b two frequency hopping periods are shown with changed sub-band to direction mapping. In this example, the frequency hopping pattern is the same across periods. However, it should be understood that the frequency hopping pattern may be changed.

Frequency hopping implies that the frequency position of the discovery signal changes over time. In other words, the discovery signal is swept across different sub-bands, one at a time. Similar to embodiments described above under the section "Discovery Signals for different directions TDM multiplexed", this design allows power to be focused into a given direction thus increasing the coverage area of the discovery signal. A drawback is that the latency for discovery may be larger due to the lack of knowledge of the signaling sub-band at the narrowband devices.

As previously mentioned, in some embodiments, the location of the signaling sub-band may not be known to the narrowband device, e.g. the receiver 107, beforehand, and since the radio front-ends of some narrowband devices, e.g. receivers 107, may only be able to receive from a limited number of sub-bands, therefore changing, e.g. periodically changing, the frequency location of the signaling sub-band allows each narrowband device, e.g. receiver 107, to detect the discovery signal by listening to a fixed sub-band all the time.

Cycling Through Different Directions

In some embodiments described above, cycling through different directions has been described. It should be understood that cycling through the different directions and transmitting discovery signals may either be done equally frequently into all directions or more often into some preferred direction. The latter is advantages if one knows that devices, e.g. receivers 107, are more often located along some directions or if one knows that devices, e.g. receivers 107, allocated in a given sector are more sensitive to latency requirements.

Sequence Design

The receiver 107 may not be aware of which discovery signal, i.e. which direction, it is currently receiving and needs therefore to correlate the received discovery signal with all possible discovery signals. It is therefore important that different discovery signals may be processed efficiently and do not require duplicating processing instances.

In a simple case, the same discovery signal is transmitted in all directions. However, if some information should be conveyed alongside with the discovery signal the same signal may not be transmitted.

One option is to transmit a unitary sequence, e.g. sequence having constant magnitude of each sequence sample, and map the sequence samples to the subcarriers of the discovery signal. Due to its constant magnitude, such sequence has a low peak-to-average power ratio and thus facilitates energy-efficient radio transmissions. For the different directions, the sequence is mapped with a different cyclic shift to the subcarriers. If the original sequence is denoted by $X_k$, the sequence mapped to the subcarriers of discovery signal for direction d is then $X_{(k-\Delta_d) mod N}$. N and $\Delta_d$ are the sequence length and the cyclic shift applied for direction d, respectively.

One particular choice of unitary sequences is Zadoff-Chu sequences given by $z_u(n)=\exp(-j\pi/N\ un(n+1))$ and $z_u(n)=\exp(-j\pi/N\ un^2)$ and for odd and even sequence length N, respectively. j is the imaginary unit sqrt(−1), u is the root sequence index, and 0≤n<N−1.

Another choice of unitary sequences is the Frank sequence, given by $z_v(n)=\exp(-j^2\pi/M\ vkl)$ for $n=kM+l, N=M^2, 0\leq n<N$.

M is an integer, j is the imaginary unit sqrt(−1), k and l are integer numbers, and V is the root sequence index.

The Frank sequences may be combined with the Zadoff-Chu sequence to enlarge the available set of different discovery signals. Both Zadoff-Chu and Frank sequences have perfect periodic auto-correlation and thus minimize the uncertainty in time synchronization.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method, in a base station, for transmitting discovery signals to a user equipment, the base station is configured for transmitting over a carrier bandwidth, the method comprising:
    transmitting two or more discovery signals over two or more beams; and
    wherein each of the two or more discovery signals is configured to span less than all of the carrier bandwidth, the carrier bandwidth is separated into sub-bands, and each of the two or more discovery signals is configured to span over one sub-band.

2. The method of claim 1, wherein transmitting the two or more discovery signals comprises transmitting the two or more discovery signals in two or more symbols.

3. The method of claim 2, wherein transmitting the two or more discovery signals further comprises:
    multiplexing, in the frequency-domain, the two or more discovery signals for the two or more beams; and
    transmitting the multiplexed two or more discovery signals in the two or more symbols.

4. The method of claim 1, wherein transmitting the two or more discovery signals further comprises:
    multiplexing, in the time-domain, the two or more discovery signals for the two or more beams; and
    transmitting the multiplexed two or more discovery signals over a same sub-band.

5. The method of claim 1, wherein transmitting the two or more discovery signals comprises transmitting the two or more discovery signals together with information indicating a beam direction.

6. The method of claim 1, wherein transmitting the two or more discovery signals comprises cyclically, over time, transmitting the two or more discovery signals into the two or more different beams.

7. A base station configured to transmit over a carrier bandwidth and to transmit discovery signals to a user equipment, the base station comprising:
    one or more processing circuits operative to control the base station to transmit two or more discovery signals over two or more beams; and
    wherein each of the two or more discovery signals is configured to span less than all of the carrier bandwidth, the carrier bandwidth is separated into sub-bands, and each of the two or more discovery signals is configured to span over one sub-band.

8. The base station of claim 7, further operative to transmit the two or more discovery signals in two or more symbols.

9. The base station of claim 8, further operative to:
    multiplex, in the frequency-domain, the two or more discovery signals for the two or more beams; and
    transmit the multiplexed two or more discovery signals in the two or more symbols.

10. The base station of claim 7, further operative to:
    multiplex, in the time-domain, the two or more discovery signals for the two or more beams; and
    transmit the multiplexed two or more discovery signals over a same sub-band.

11. The base station of claim 7, further operative to transmit the two or more discovery signals together with information indicating a beam direction.

12. The base station of claim 7, further operative to transmit, cyclically, over time, the two or more discovery signals into different beams.

13. A method, in a user equipment, for receiving discovery signals from a base station, the user equipment is configured for receiving over a carrier bandwidth, the method comprising:
    receiving, from the base station, at least a first discovery signal of two or more discovery signals that have been transmitted over two or more beams; and
    wherein each of the two or more discovery signals is configured to span less than all of the carrier bandwidth, the carrier bandwidth is separated into sub-bands and each of the two or more discovery signals is configured to span over one sub-band.

14. The method of claim 13, wherein receiving comprises receiving two or more discovery signals in two or more symbols.

15. The method of claim 14, wherein the two or more discovery signals have been transmitted by:
    multiplexing, in the frequency-domain, the two or more discovery signals for the two or more beams; and
    transmitting the multiplexed two or more discovery signals in the two or more symbols.

16. The method of claim 13, wherein the two or more discovery signals have been transmitted by:
    multiplexing, in the time-domain, the two or more discovery signals for the two or more beams; and
    transmitting the multiplexed two or more discovery signals over a same sub-band.

17. The method of claim 13, wherein the receiving comprises receiving at least the first discovery signal together with information indicating a beam direction.

18. The method of claim 13, wherein the receiving comprises cyclically, over time, receiving the first discovery signal, which has been transmitted in different beams.

19. A user equipment configured to receive over a carrier bandwidth and to receive discovery signals from a base station, the user equipment comprising:
    a receiver configured to receive, from the base station, at least a first discovery signal of two or more discovery signals that have been transmitted over two or more beams; and
    wherein each of the two or more discovery signals is configured to span less than all of the carrier bandwidth, the carrier bandwidth is separated into sub-bands, and each of the two or more discovery signals is configured to span over one sub-band.

20. The user equipment of claim 19, further configured to receive the first discovery signal in two or more symbols.

21. The user equipment of claim 20, wherein the two or more discovery signals have been transmitted by:
    multiplexing, in the frequency-domain, the two or more discovery signals for the two or more beams; and
    transmitting the multiplexed two or more discovery signals in the two or more symbols.

22. The user equipment of claim 19, wherein the two or more discovery signals have been transmitted by:
    multiplexing, in the time-domain, the two or more discovery signals for the two or more beams; and
    transmitting the multiplexed two or more discovery signals over a same sub-band.

23. The user equipment of claim 19, wherein the receiver is further configured to receive at least the first discovery signal together with information indicating a beam direction.

24. The user equipment of claim 19, wherein the receiver is further configured to receive cyclically, over time, the first discovery signal, which has been transmitted in different beams.

25. The method of claim 1, wherein transmitting the two or more discovery signals comprises transmitting the two or more discovery signals together with information indicating a frequency offset to a carrier center.

26. The method of claim 1, wherein transmitting the two or more discovery signals comprises transmitting the two or more discovery signals together with information indicating the base station.

27. The base station of claim 7, further operative to transmit the two or more discovery signals together with information indicating a frequency offset to a carrier center.

28. The base station of claim 7, further operative to transmit the two or more discovery signals together with information indicating the base station.

29. The method of claim 13, wherein the receiving comprises receiving at least the first discovery signal together with information indicating a frequency offset to a carrier center.

30. The method of claim 13, wherein the receiving comprises receiving at least the first discovery signal together with information indicating the base station.

31. The user equipment of claim 19, wherein the receiver is further configured to receive at least the first discovery signal together with information indicating a frequency offset to a carrier center.

32. The user equipment of claim 19, wherein the receiver is further configured to receive at least the first discovery signal together with information indicating the base station.

* * * * *